US007357020B2

(12) United States Patent
Maley et al.

(10) Patent No.: US 7,357,020 B2
(45) Date of Patent: Apr. 15, 2008

(54) VALVE-TESTING SYSTEM AND METHOD EMPLOYING A FLUID-TRANSFER SYSTEM WITH A RESERVOIR

(75) Inventors: Dale Charles Maley, Fairbury, IL (US); Michel Blane Montgomery, Flanagan, IL (US); Stephen Robert Lewis, Chillicothe, IL (US); Byron Reed Stalter, Hudson, IL (US); Karl Larry Sickmann, Pontiac, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/362,831

(22) Filed: Feb. 28, 2006

(65) Prior Publication Data

US 2007/0199375 A1 Aug. 30, 2007

(51) Int. Cl.
*G01M 15/02* (2006.01)

(52) U.S. Cl. .................................................... 73/119 A

(58) Field of Classification Search .............. 73/119 A, 73/112, 113, 114, 115, 116, 117.1, 117.2, 73/117.3, 118.1
See application file for complete search history.

(56) References Cited

U.S. PATENT DOCUMENTS

| | | | |
|---|---|---|---|
| 4,453,403 A | 6/1984 | Bussey et al. | |
| 4,798,084 A | 1/1989 | Takahashi et al. | |
| 5,000,043 A | 3/1991 | Bunch, Jr. et al. | |
| 5,641,891 A | 6/1997 | Frankl et al. | |
| 6,053,037 A * | 4/2000 | Kojima et al. | 73/119 A |
| 6,532,809 B2 | 3/2003 | Robinson | |
| 6,817,233 B2 | 11/2004 | Toiyama et al. | |
| 6,840,233 B2 | 1/2005 | Lingenhult et al. | |
| 6,915,683 B2 | 7/2005 | Schoeffel et al. | |
| 2003/0140686 A1 | 7/2003 | Bindel et al. | |
| 2005/0034514 A1 | 2/2005 | Shen | |

FOREIGN PATENT DOCUMENTS

| | | |
|---|---|---|
| JP | 61-004860 | 1/1986 |
| JP | 64-063650 | 3/1989 |
| WO | WO 02064970 | 8/2002 |
| WO | WO 02070996 | 9/2002 |

OTHER PUBLICATIONS

Zeuch, W., Neue Verfahren zur Messung des Einspritzgesetzes und der Einspritz-RegelmaBigkeit von Diesel-Einspritzpumpen, MTZ, Sep. 1961, pp. 344-349, vol. 22, Issue 9.

(Continued)

*Primary Examiner*—Eric S. McCall
(74) *Attorney, Agent, or Firm*—Finnegan, Henderson, Farabow, Garrett & Dunner

(57) ABSTRACT

A valve-testing system for gathering information relating to the operation of a fuel injector. The valve-testing system may include a fluid-transfer system. The fluid-transfer system may include an inlet configured to receive fluid discharged by the fuel injector, an outlet, a reservoir having a first port and a second port, first plumbing connected between the inlet and the first port of the reservoir, and second plumbing connected between the second port of the reservoir and the outlet. The valve-testing system may also include a sensor configured to provide a signal relating to pressure in the first plumbing.

19 Claims, 2 Drawing Sheets

OTHER PUBLICATIONS

Ishikawa et al., Measurement of Rate of Multiple-Injection in CDI Diesel Engines, 1998, Society of Automotive Engineers, Inc., 6 pages.

Bower et al., A Comparison of the Bosch and Zuech Rate of Injection Meters, Feb. 25, 1991, SAE Technical Paper Series, publication No. 910724, Society of Automotive Engineers, Inc., pp. 1-9.

Ikeda et al., Measurement of the Rate of Multiple Fuel Injection with Diesel Fuel and DME, Mar. 5, 2001, SAE Technical Paper Series, publication No. 2001-02-0527, Society of Automotive Engineers.

PCT International Search Report mailed May 7, 2007 for international application No. PCT/US2007/000533.

* cited by examiner

VALVE-TESTING SYSTEM AND METHOD EMPLOYING A FLUID-TRANSFER SYSTEM WITH A RESERVOIR

TECHNICAL FIELD

The present disclosure relates to systems and methods for evaluating the operation of valves.

BACKGROUND

Many systems use one or more valves to control fluid flow to or from devices of the system. For example, many engines include fuel injectors, which are valves that control the flow of fuel into combustion chambers of the engine. In order to achieve desirable performance, such systems may require that the valves thereof operate as intended. Accordingly, many valves, including many fuel injectors, are tested for proper operation before they are assembled to a system. Various systems and methods exist for testing valves. Some systems and methods for testing valves include attaching a valve to plumbing, selectively opening the valve to allow fluid flow through the plumbing, and measuring pressure inside the plumbing as an indicator of one or more aspects of the performance of the valve. Unfortunately, when using such a system and method to evaluate the operation of a valve, pressure waves triggered by starting and stopping fluid flow from the valve and reflections of these pressure waves may complicate the process of evaluating the performance of the valve.

U.S. Pat. No. 6,817,233 to Toiyama et al. ("the '233 patent") shows a system for testing the operation of a fuel injector, the system including provisions for damping pressure waves generated when the fuel injector is opened. The system disclosed by the '233 patent includes a fluid-supply system connected to an inlet of the fuel injector. The fluid-supply system includes a fluid reservoir, a pump that draws fluid from the reservoir, and plumbing that directs fluid from the pump to the inlet of the fuel injector. The plumbing that connects the pump to the inlet of the fuel injector includes a volume enlargement chamber disposed slightly upstream of the fuel injector for damping pressure waves generated by opening and closing the fuel injector. The system of the '233 patent also includes a pressure sensor for measuring the pressure in the plumbing upstream of the volume enlargement chamber.

Although the system of the '233 patent includes provisions for damping pressure waves generated by opening and closing the fuel injector, certain disadvantages persist. For example, measuring the pressure upstream of the injector may create the potential for complications in evaluating the performance of the fuel injector because of potential variations in the pressure at which fluid is supplied to the fuel injector. Additionally, while a volume enlargement chamber in the plumbing connected to the fuel injector may help damp pressure waves, some pressure waves generated by opening and closing the fuel injector may still travel through the volume enlargement chamber and reach the pressure sensor.

The valve-testing system and methods of the present disclosure solve one or more of the problems set forth above.

SUMMARY OF THE INVENTION

One disclosed embodiment relates to a valve-testing system for gathering information relating to the operation of a fuel injector. The valve-testing system may include a fluid-transfer system. The fluid-transfer system may include an inlet configured to receive fluid discharged by the fuel injector, an outlet, a reservoir having a first port and a second port, first plumbing connected between the inlet and the first port of the reservoir, and second plumbing connected between the second port of the reservoir and the outlet. The valve-testing system may also include a sensor configured to provide a signal relating to pressure in the first plumbing.

Another embodiment relates to a method of gathering information relating to the operation of a fuel injector. The method may include causing the fuel injector to discharge fluid into an inlet of a fluid-transfer system. The fluid-transfer system may include a reservoir connected between the inlet of the fluid-transfer system and an outlet of the fluid-transfer system. Additionally, the method may include, while causing the fuel injector to discharge fluid into the inlet of the fluid-transfer system, gathering information relating to pressure in a portion of the fluid-transfer system that connects the inlet of the fluid-transfer system and the reservoir.

A further embodiment relates to a system that includes a fluid-transfer system with a reservoir having a first port and a second port. The fluid-transfer system may also include first plumbing connected to the first port and disposed outside of the reservoir. Additionally, the fluid-transfer system may include second plumbing connected to the second port and disposed outside of the reservoir. The fluid-transfer system may further include a passage extending from the first port into the reservoir. The system may also include a valve connected to the first plumbing. Additionally, the system may include a sensor configured to provide a signal relating to pressure in the first plumbing.

DETAILED DESCRIPTION

Figure 1:
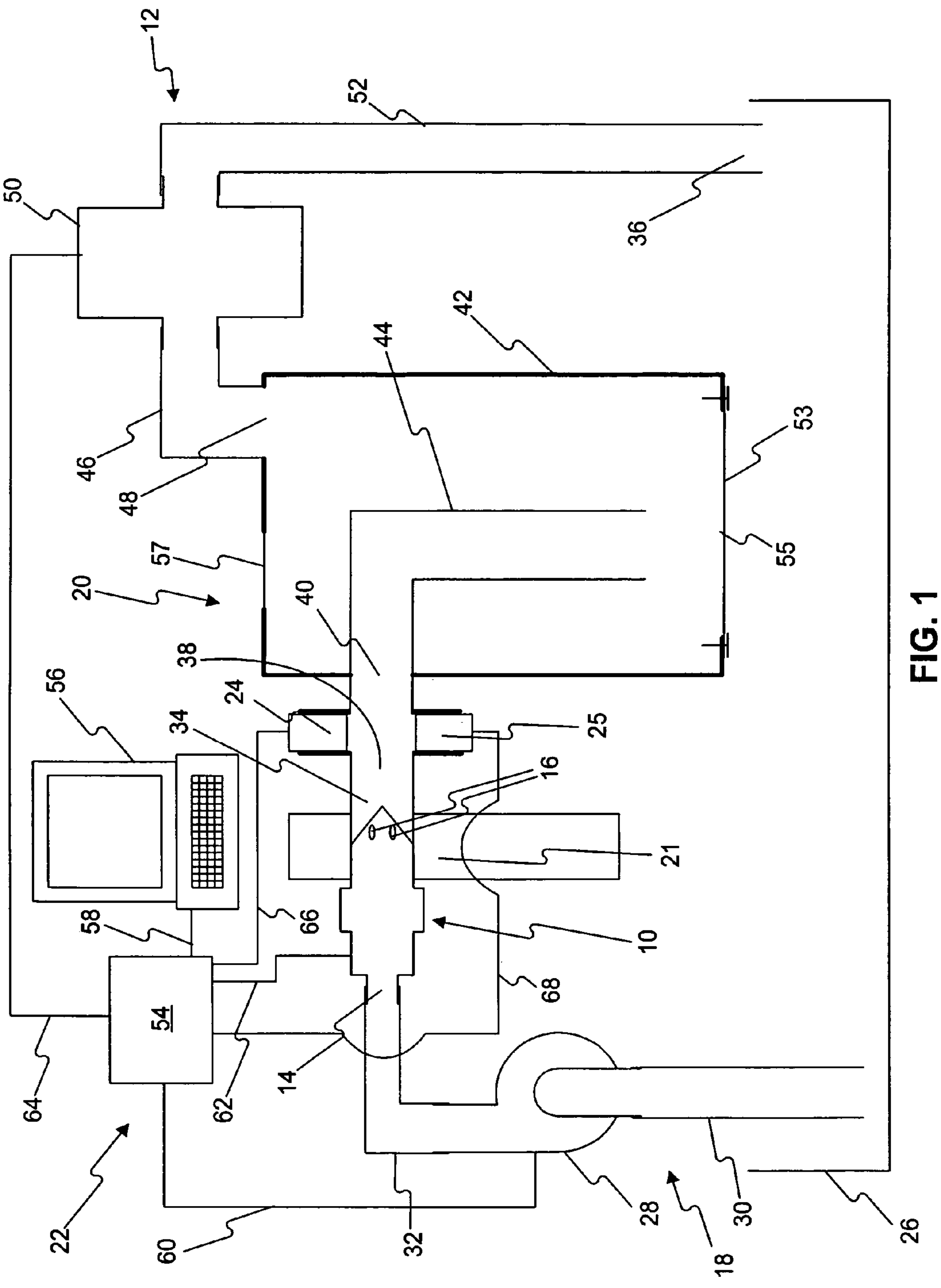
FIG. 1 is a schematic illustration of a valve connected one embodiment of a valve-testing system according to the present disclosure.

FIG. 1 illustrates a valve 10 connected to one embodiment of a valve-testing system 12 according to the present disclosure. Valve 10 may be any type of device having an inlet 14 for receiving fluid, an outlet 16 for discharging fluid, and provisions for controlling the rate of fluid discharge from outlet 16. In some embodiments, such as the one shown in FIG. 1, valve 10 may be a fuel injector for an engine (not shown), such as a compression-ignition engine or a spark-ignition engine. Outlet 16 may include a single opening, or outlet 16 may include a plurality of openings, as FIG. 1 shows. Valve 10 may be configured to be actuated in various manners, including, but not limited to, mechanically, hydraulically, pneumatically, electrically, and/or magnetically. In some embodiments, valve 10 may be capable of discharging multiple shots of fluid from outlet 16 in rapid succession. For example, valve 10 may be capable of discharging multiple shots of fluid sufficiently rapidly that valve 10 may discharge multiple shots of fuel into a combustion chamber (not shown) of an engine (not shown) during a single combustion cycle.

Valve-testing system 12 may include a fluid-supply system 18, a fluid-transfer system 20, a valve mount 21, controls 22, a sensor 24, and a sensor 25. Fluid-supply system 18 may be connected to inlet 14 of valve 10 and configured to supply fluid thereto. Fluid-supply system 18 may include a reservoir 26, a pump 28, and passages 30, 32 connecting reservoir 26, pump 28, and inlet 14 of valve 10.

Fluid-transfer system 20 may have an inlet 34 in fluid communication with outlet 16 of valve 10, an outlet 36 in fluid communication with reservoir 26, and various plumbing connecting inlet 34 and outlet 36. A passage 38 may extend from inlet 34 to a port 40 of a reservoir 42. Fluid-transfer system 20 may be configured to sealingly connect valve 10 to inlet 34 so that fluid discharged from outlet 16 of valve 10 may only enter fluid-transfer system 20. In embodiments where valve 10 is a fuel injector, fluid-transfer system 20 may include various different types of features for sealingly connecting the fuel injector to inlet 34, dependent upon the construction of the fuel injector. A passage 44 may extend from port 40 into reservoir 42. Passage 44 may be bent. For example, as FIG. 1 shows, passage 44 may be bent at a substantially right angle. A passage 46 may extend from a port 48 of reservoir 42 to a flow meter 50. From flow meter 50, a passage 52 may extend to outlet 36 of fluid-transfer system 20. As FIG. 1 shows, outlet 36 may be in fluid communication with atmospheric pressure.

Fluid-transfer system 20 may be configured such that discharging fluid from valve 10 into inlet 34 creates measurable dynamic pressure in passage 38. For example, passage 44 may be constructed with such a length and cross-section to create measurable backpressure in passage 38 when valve 10 is discharging fluid into inlet 34 and fluid is flow through passages 38, 44 into reservoir 42. Additionally, the shape and size of passage 38 may contribute to creating measurable backpressure in passage 38 when valve 10 is discharging fluid into inlet 34. In some embodiments, fluid-transfer system 20 may be constructed with sufficient restriction in passages 38, 44 that discharging fluid from valve 10 at rates that simulate operation in service will create sufficient dynamic pressure in passage 38 that signals from sensors 24, 25 may be used to discern the rate of fluid discharge by valve 10. For example, in embodiments where valve 10 is a fuel injector, passage 38 and passage 44 may create sufficient restriction to allow using signals from sensors 24, 25 to discern variation in the rate of discharge of fluid from the fuel injector when the fuel injector is operated in a manner simulating operation in service.

Flow meter 50 may be any type of device configured to measure the volumetric flow of fluid in fluid-transfer system 20. For example, flow meter 20 may be a conventional rod-and-cylinder type flow meter, a positive-displacement rotary type flow meter, or some other type of flow meter configured to be mechanically driven by fluid flow in fluid-transfer system 20. Additionally, in some embodiments, flow meter 50 may be configured to measure fluid flow in fluid-transfer system 20 through means other than the fluid flow mechanically driving one or more components of flow meter 50. Furthermore, in some embodiments, flow meter 50 may not form part of the fluid connection between inlet 34 and inlet 36. In such embodiments, flow meter 50 may be disposed inside and/or outside of fluid-transfer system 20.

Fluid-transfer system 20 may also include various provisions for promoting reliable operation of valve-testing system 12. For example, reservoir 42 may include a removable cover 53 disposed over an access opening 55. Additionally, fluid-transfer system 20 may include a pressure-relief device 57 between inlet 34 and outlet 36. Pressure-relief device 57 may be a sacrificial type pressure-relief device configured to rupture when pressure inside fluid-transfer system 20 becomes undesirably high. Alternatively, pressure-relief device 57 may be a valve or other type of reusable pressure-relief device operable to release pressure from fluid-transfer system 20 when it becomes undesirably high. Pressure-relief device 57 may be located in the wall of reservoir 42, as FIG. 1 shows, or pressure relief device 57 may be located at another location between inlet 34 and outlet 36.

Valve mount 21 may be any type of component operable to support valve 10 with outlet 16 at inlet 34 of fluid-transfer system 20. As FIG. 1 shows, valve mount 21 may also be configured to support passage 38.

Controls 22 may be operable to control fluid-supply system 18 and valve 10. Controls 22 may include a controller 54, an operator interface 56, an operative connection 58 between controller 54 and operator interface 56, an operative connection 60 between controller 54 and pump 28, and an operative connection 62 between controller 54 and valve 10. Operator interface 56 and operative connection 58 may be operable to allow transmission of information between controller 54 and an operator. Operative connections 60, 62 may be configured to allow controller 54 to exercise control over one or more aspects of the operation of pump 28 and valve 10. Toward this end, operative connections 60, 62 may include various types of components, including, but not limited to, electrical, mechanical, hydraulic, magnetic, and/or pneumatic components. Controller 54 may include one or more processors (not shown) and one or more memory devices (not shown). Controller 54 may be operable to automatically control one or more aspects of the operation of pump 28 and valve 10 in response to inputs from operator interface 56 and/or other sources.

Controller 54 may also be operatively connected to various other components. For example, valve-testing system 10 may include an operative connection 64 between controller 54 and flow meter 50, allowing transmission of information therebetween. Similarly, operative connections 66, 68 may allow communication between controller 54 and sensors 24, 25.

Each sensor 24, 25 may be any type of device operable to provide controller 54 with a signal relating to pressure inside passage 38. In some embodiments, one or both of sensors 24, 25 may be in fluid communication with the interior of passage 38 and configured to directly sense the pressure in passage 38. Alternatively, one or both of sensors 24, 25 may be arranged to measure parameters related to the pressure in passage 38. For example, one or both of sensors 24, 25 may be a strain gauge configured to measure strain in the wall of passage 38. In some embodiments, one or both of sensors 24, 25 may be piezoelectric sensors. Additionally, sensors 24 may be optimized for sensing a different range of pressures than sensor 25 is optimized to sense.

Valve-testing system 12 is not limited to the configuration shown in FIG. 1. For example, fluid-transfer system 20 may include additional inlets other than inlet 34 and/or additional outlets other than outlet 36. Additionally, fluid-transfer system 20 may omit some of the plumbing shown in FIG. 1 and/or include various plumbing and/or other types of components not shown in FIG. 1, such as passages, reservoirs, manifolds, valves, filters, and/or restrictors. Furthermore, fluid-supply system 18 may include various additional components, such as pumps, valves, and filters. Additionally, valve-testing system 12 may omit one of sensors 24, 25. Moreover, valve-testing system may include other sensors in addition to sensors 24, 25.

Additionally, controls 22 may be configured differently than shown in FIG. 1. For example, in addition to controller

54, controls 22 may include various other components for automatically controlling one or more aspects of the operation of valve-testing system 12, including, but not limited to, other controllers, hardwired electrical controls, mechanical controls, hydraulic controls, and/or pneumatic controls. Additionally, in some embodiments, controls 22 may be configured to allow manual control of some or all aspects of the operation of valve-testing system 12.

INDUSTRIAL APPLICABILITY

Valve-testing system 12 may have application wherever it may be desired to gather information relating to the operation of a valve. Operation of valve-testing system 12 will be described herein below.

In some embodiments, before using valve-testing system 12 to gather information relating to the operation of valve 10, an operator may fully or partially fill reservoir 26 with a substantially incompressible fluid and prime fluid-supply system 18, valve 10, and fluid-transfer system 20 with the same fluid. In some embodiments where valve 10 is a fuel injector, the substantially incompressible fluid may be a nonvolatile fluid having mechanical properties similar to the fuel that valve 10 will discharge in service.

Once valve-testing system 12 and valve 10 are primed, an operator may use operator interface 56 to command controller 54 to gather information relating to the operation of valve 10. Controller 54 may gather information relating to the operation of valve 10 by receiving information from sensors 24, 25 and flow meter 50 while causing valve 10 to continuously or intermittently discharge fluid into inlet 34 of fluid-transfer system 20. With fluid-transfer system 20 primed with substantially incompressible fluid, as valve 10 discharges fluid into inlet 34, fluid may flow through flow meter 50 at substantially the same rate that valve 10 discharges fluid into inlet 34. Accordingly, information that controller 54 receives from flow meter 50 may relate to the rate at which valve 10 is discharging fluid and the quantity of fluid valve 10 has discharged. In some embodiments and/or circumstances, information from flow meter 50 may be a particularly reliable indicator of the total quantity of fluid discharged by valve 10 over a period of time. Additionally, because of restrictions in fluid-transfer system resulting from the shape of the plumbing thereof, such as passages 38, 44, as valve 10 discharges fluid into inlet 34, the pressure within passage 38 may depend at least in part upon the rate at which valve 10 is discharging fluid. Accordingly, the signals from sensors 24, 25 may depend at least in part upon the rate at which valve 10 discharges fluid from outlet 36.

The disclosed embodiments of fluid-transfer system 20 may help ensure that information from sensors 24, 25 provide an accurate indication of how the rate of fluid discharge by valve 10 varies over time. When valve 10 starts discharging fluid or stops discharging fluid, a pressure wave may travel from inlet 34 of fluid-transfer system 20 toward outlet 36. When such a pressure wave reaches certain points, a reflected pressure wave may travel back toward inlet 34. For example, when a pressure wave traveling toward outlet 36 reaches flow meter 50 or outlet 36, a reflected pressure wave may travel back toward inlet 34. The amplitude of such a reflected pressure wave may diminish substantially between port 48 and port 40 of chamber 42. The large mass and cross-sectional area of fluid in chamber 42 may absorb much of the energy of the reflected pressure wave. Additionally, the inclusion of passage 44 extending from port 40 into chamber 42 may help suppress the transmission of reflected pressure waves from port 48 to port 40, particularly in embodiments where passage 44 is bent. Without disturbance from reflected pressure waves, the information from pressure sensors 24, 25 may be a reliable indicator of how the rate of discharge from valve 10 varies over time.

Accordingly, valve-testing system 12 may be able to use information from flow meter 50 and sensors 24, 25 to accurately determine the total quantity of fluid discharged from valve 10 over a period of time and one or more aspects of the time variance of fluid discharge over the same period of time. This ability may be used to evaluate the performance of valve 10 in many ways. In some embodiments where valve 10 is a fuel injector, valve-testing system 12 may be used to evaluate the ability of valve 10 to effectively execute a desired multiple-shot fuel discharge during a power cycle of an engine. For example, controller 54 may control valve 10 to discharge five shots of liquid in a time frame that would be appropriate for discharge of fuel during a power cycle of an engine. Simultaneously, controller 54 may receive information from flow meter 50 and sensors 24, 25.

Figure 2:
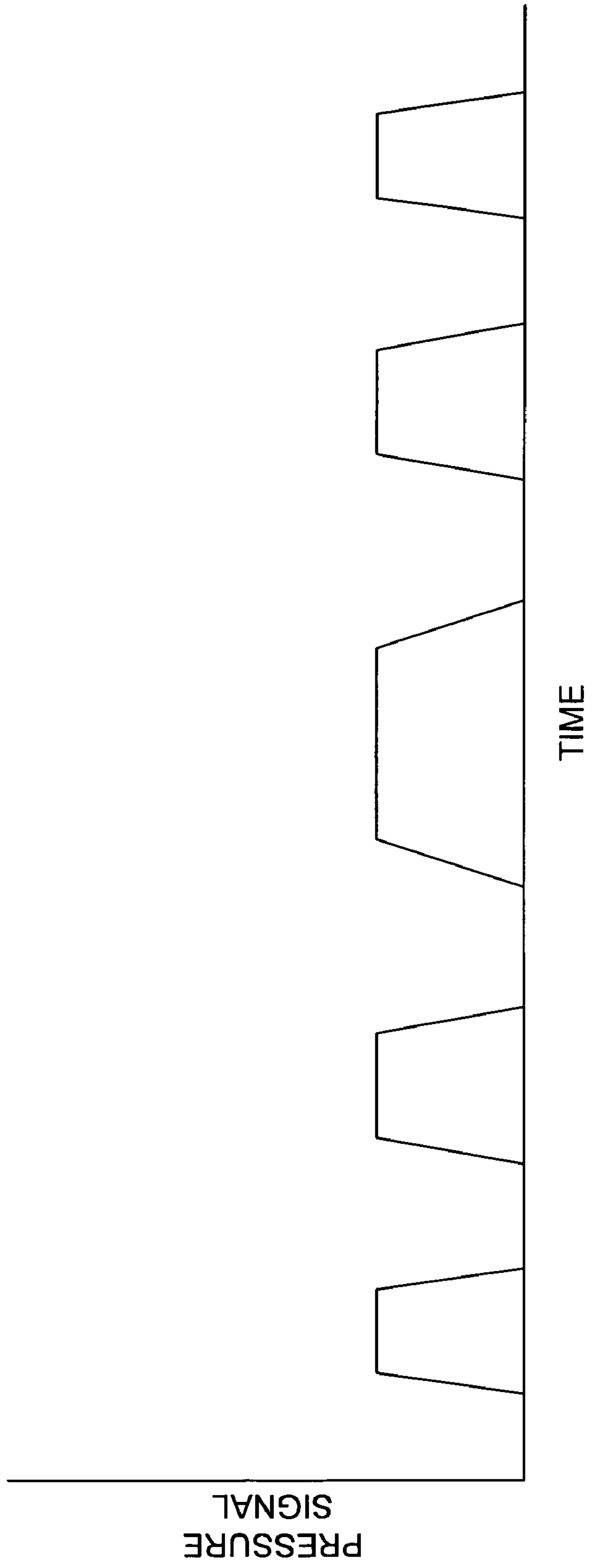
FIG. 2 is a graphical illustration of information that a sensor of a valve-testing system may produce during one embodiment of a method of evaluating the operation of a valve.

Controller 54 may then use the information from flow meter 50 and sensors 24, 25 to determine the timing of each fluid shot, the quantity of fluid discharged with each fluid shot, and the manner in which the rate of fluid discharge changed during each fluid shot. FIG. 2 provides a graphical illustration of information that controller 54 may receive from a sensor 24 or 25 when causing valve 10 to execute a five-shot fluid discharge. From this information, controller 54 may determine the time at which each distinct shot of fluid began and ended. Furthermore, controller 54 may determine the relative sizes of the five respective shots of fluid. Controller 54 may use the information from flow meter 50 to determine the total quantity of fluid discharged over the course of the five shots. Having determined the total quantity of fluid discharged and the relative sizes of the five shots, controller 54 may then determine the quantity of fluid discharged in each of the five shots. With knowledge of the quantity of fluid discharged in each fluid shot and the manner in which the pressure in passage 38 varied over the course of each fluid shot, controller 54 may determine the manner in which the rate of fluid discharge varied over the course of each fluid shot.

In some embodiments and/or circumstances, valve-testing system 12 may also be used evaluate the ability of valve 10 to consistently discharge fluid in a particular manner. For example, controller 54 may repeatedly execute the above-described process of causing valve 10 to execute a five-shot fluid discharge and determining the timing and size of each of the five shots. Controller 54 may then calculate statistical information about the operation of valve 10, such as the standard deviation of the timing and size of each of the first through fifth shots over the course of multiple executions of the five-shot fluid discharge.

Operation of valve-testing system 12 is not limited to the embodiments discussed above. For example, valve-testing system 12 may be operated to evaluate the ability of valve 10 to effectively execute multiple-shot discharges with shot counts higher or lower than five. Additionally, valve-testing system 12 may be operated to evaluate the performance of valve 10 at many tasks other than executing multiple-shot fluid discharges. Furthermore, in some embodiments, some of the actions described above as being performed automatically by controller 54 may be performed manually.

The disclosed embodiments may provide a number of advantages. Evaluating the performance of valve 10 using pressure downstream of valve 10 may avoid possible complications from variation in the pressure at which fluid-supply system 18 supplies fluid to valve 10. Additionally, passage 44 may enhance the effectiveness of chamber 42 in suppressing transmission of reflected pressure waves, which may help ensure that the pressure in passage 38 is closely related to the fluid discharge rate of valve 10. Furthermore, using multiple sensors 24, 25 that are optimized for different pressure ranges may help ensure accurate collection of information relating to the pressure in passage 38, which may contribute to accurately determining the fluid discharge rate of valve 10.

Additionally, the disclosed embodiments may promote reliable operation of valve-testing system 12. Constructing chamber 42 with access opening 55 and removable cover 53 may facilitate proper maintenance of valve-testing system 12. When valve-testing system 12 is used, debris may accumulate in various parts of fluid-transfer system 20, including chamber 42. Buildup of debris in fluid-transfer system 20 may be detrimental to the performance and/or longevity of valve-testing system 12 and valve 10. An operator may easily clean debris out of fluid-transfer system 20 by detaching removable cover 53 and extracting debris through access opening 55. If debris should obstruct fluid-transfer system 12, pressure-relief device 57 may prevent undesirably high pressures that could damage other components of fluid-transfer system 12.

It will be apparent to those skilled in the art that various modifications and variations can be made in the valve-testing system and methods without departing from the scope of the disclosure. Other embodiments of the disclosed valve-testing system and methods will be apparent to those skilled in the art from consideration of the specification and practice of the valve-testing system and methods disclosed herein. It is intended that the specification and examples be considered as exemplary only, with a true scope of the disclosure being indicated by the following claims and their equivalents.

What is claimed is:

1. A valve-testing system for gathering information relating to the operation of a fuel injector, the valve-testing system comprising:
- a fluid-transfer system, including
  - an inlet configured to receive fluid discharged by the fuel injector,
  - an outlet,
  - a reservoir having a first port and a second port,
  - first plumbing connected between the inlet and the first port of the reservoir, and
  - second plumbing connected between the second port of the reservoir and the outlet; and
- a sensor configured to provide a signal relating to pressure in the first plumbing, wherein the sensor is a first pressure sensor in fluid communication with an interior of the first plumbing, the first pressure sensor being optimized for a first range of pressures; and
- a second pressure sensor in fluid communication with the interior of the first plumbing, the second pressure sensor being optimized for a second range of pressures.

2. The valve-testing system of claim 1, wherein the second plumbing of the fluid-transfer system includes a flow meter.

3. The valve-testing system of claim 1, wherein the fluid-transfer system further includes a passage that extends from the first port of the reservoir into the reservoir.

4. The valve-testing system of claim 3, wherein the passage is bent.

5. The valve-testing system of claim 1, wherein the reservoir includes an access opening and a removable cover disposed over the access opening.

6. The valve-testing system of claim 1, further including: controls operable to cause the fuel injector to discharge fluid into the inlet of the fluid-transfer system.

7. The valve-testing system of claim 6, wherein the controls are further configured to use the signal from the sensor to determine at least one of a rate of fluid discharge by the valve and a quantity of fluid discharged by the fuel injector during a period.

8. The valve-testing system of claim 1, wherein the fluid-transfer system includes a pressure-relief device between the inlet and the outlet.

9. The valve-testing system of claim 1, wherein the first plumbing includes a passage.

10. A method of gathering information relating to the operation of a fuel injector, the method including:
- causing the fuel injector to discharge fluid into an inlet of a fluid-transfer system, the fluid-transfer system including a reservoir connected between the inlet of the fluid-transfer system and an outlet of the fluid-transfer system;
- while causing the fuel injector to discharge fluid into the inlet of the fluid-transfer system, gathering information relating to pressure in a portion of the fluid-transfer system that connects the inlet of the fluid-transfer system and the reservoir;
- wherein causing the fuel injector to discharge fluid into the inlet of the fluid-transfer system includes causing the fuel injector to make a multiple-shot discharge of fluid into the inlet of the fluid-transfer system; and
- wherein the method further includes
  - gathering information relating to the total volume of fluid discharged during the multiple-shot discharge, and
  - using the information gathered relating to the total volume of fluid discharged during the multiple-shot discharge and the information gathered relating to the pressure in the portion of the fluid-transfer system that connects the inlet of the fluid-transfer system and the reservoir to determine the size of one or more individual shots of the multiple-shot discharge.

11. The method of claim 10, further including:
- using the information gathered relating to pressure in the portion of the fluid-transfer system that connects the inlet and the reservoir to determine the timing of one or more individual shots of the multiple-shot discharge.

12. The method of claim 10, wherein:
- gathering information relating to the total volume of fluid discharged during the multiple-shot discharge includes using a flow meter connected between the reservoir and the outlet of the fluid-transfer system to gather data relating to the volume of fluid discharged by the injector.

13. The method of claim 10, further including using the information gathered relating to pressure in the portion of the fluid-transfer system between the inlet and the reservoir to determine at least one of a rate of fluid discharge by the fuel injector and a quantity of fluid discharged by the fuel injector during a period.

14. A system, comprising:
- a fluid-transfer system, including
  - a reservoir having a first port and a second port,
  - first plumbing connected to the first port and disposed outside of the reservoir, second plumbing connected to the second port and disposed outside of the reservoir, and a passage extending from the first port into the reservoir;

a valve connected to the first plumbing; and a sensor configured to provide a signal relating to pressure in the first plumbing.

15. The system of claim 14, wherein an outlet of the valve is connected to the first plumbing.

16. The system of claim 14, wherein the passage is bent.

17. The system of claim 14, wherein the passage is bent approximately at a right angle.

18. The system of claim 14, wherein the first plumbing or the second plumbing includes a flow meter.

19. The system of claim 14, wherein the sensor is a pressure sensor in fluid communication with the interior of the first plumbing.

* * * * *